Dec. 18, 1934. G. WIRRER ET AL 1,984,618
CLUTCH SYNCHRONIZING DEVICE
Filed March 23, 1933
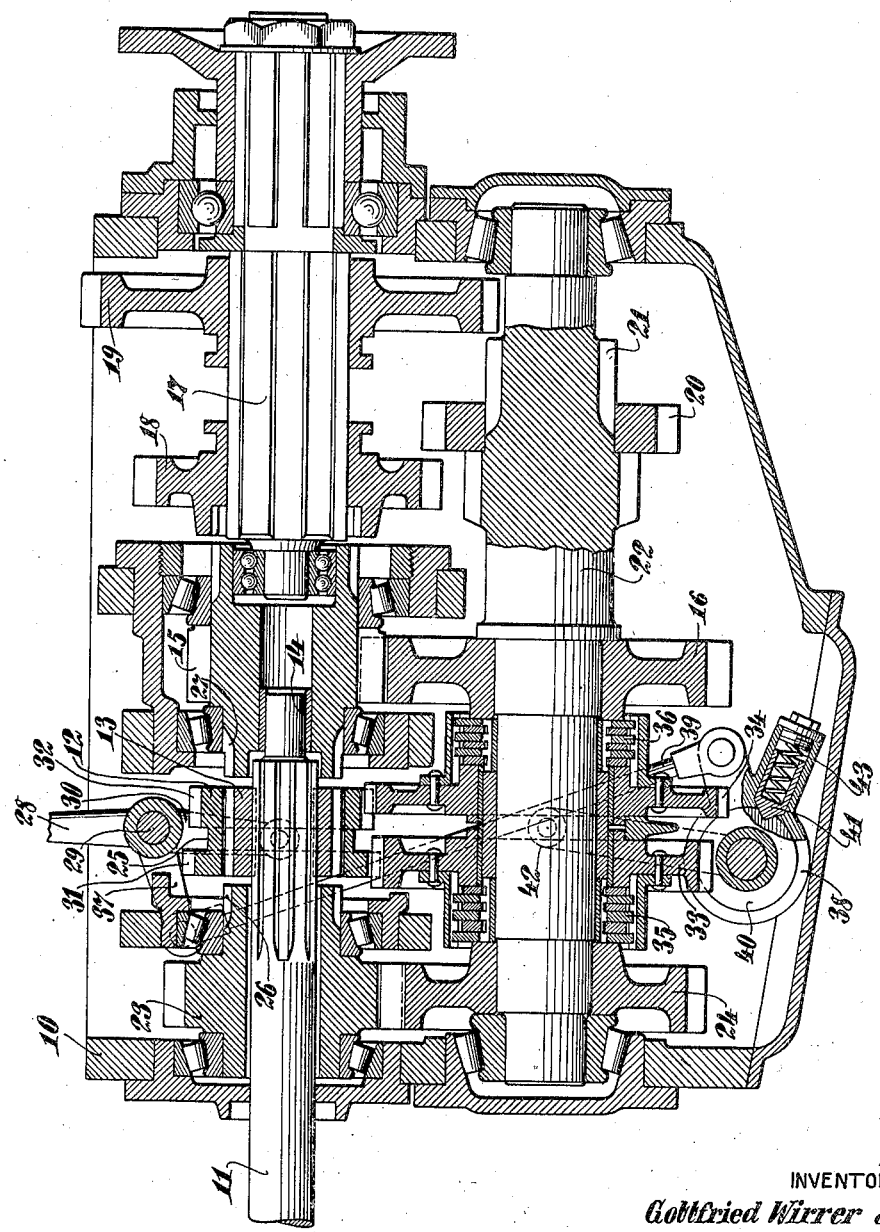
INVENTORS:
Gottfried Wirrer and
Azor D. Robbins,
BY
Redding, Greeley, O'Shea & Campbell
THEIR ATTORNEYS Patented Dec. 18, 1934

1,984,618

UNITED STATES PATENT OFFICE 1,984,618

CLUTCH SYNCHRONIZING DEVICE

Gottfried Wirrer, Plainfield, and Azor D. Robbins, Highland Park, N. J., assignors to International Motor Company, New York, N. Y., a corporation of Delaware Application March 23, 1933, Serial No. 662,283

4 Claims. (Cl. 74—339)

The present invention relates to transmissions for motor vehicles and embodies, more specifically, an improved form of transmission having means for synchronizing the speeds of rotation of gears which are to be engaged. More particularly, the invention comprises, in combination with a transmission mechanism, a synchronizing clutch construction by means of which excessive shock and noise may be eliminated during shifting operations.

In certain transmission constructions, particularly where sets of gears are provided for shifting from various ranges, the shock occurring in shifting between ranges has proved to be so great as to endanger the transmission construction. With the foregoing in view, it is an object of the present invention to provide a transmission mechanism having gear sets for selecting a plurality of speed ranges, said transmission being provided with means to insure quiet shifting of the gears in effecting range selections.

A further object of the invention is to provide a transmission having a plurality of sets of range gears and means for effecting the selective engagement thereof, additional means being provided for synchronizing the speeds of rotation of the gears to be engaged.

A further object of the invention is to provide a transmission having a plurality of sets of range gears and shifting mechanism therefor, synchronizing means being incorporated therein and operable by the shifting mechanism for synchronizing the speeds of rotation of the gears to be engaged.

A further object of the invention is to provide a synchronizing clutch construction by means of which the shifting of a clutch member of a transmission mechanism is accompanied with a synchronization of the speed thereof with that of a member into engagement with which the clutch is moved.

The attainment of the invention is accomplished by the provision of two pairs of narrow faced gears of approximately the same ratio as the gears of the constant mesh sets in the transmission with which the elements are to be associated. In practice, the ratios of the narrow faced gears are not identical with those of the constant mesh gears in order that a slight relative ratio may take place to prevent a condition where the teeth to be engaged butt together and prevent engagement. This, of course, is a matter of design and does not enter into the present invention.

Further objects of the invention will be apparent as the invention is described in connection with the accompanying drawing, wherein the single figure is a view in section, taken through a transmission provided with sets of range gears and a clutch synchronizing device constructed in accordance with the present invention.

In the accompanying drawing, a transmission is shown having a housing 10 and a drive shaft 11 at its forward end. The drive shaft 11 drives a clutch 12 which is splined to a toothed member 13, keyed to shaft 11.

The drive shaft 11 may be journaled at 14 in a gear 15 which, in turn, is journaled within the transmission housing and a tail shaft 17 is provided upon which gears 18 and 19 may be mounted for engagement with cooperating gears 20 and 21, formed upon a counter shaft 22. Counter shaft 22 is also provided with a gear 16 which is in constant mesh with gear 15 and a gear 24 which is in constant mesh with a gear 23, journaled within the housing 10 and concentric with drive shaft 11.

A clutch 12 is formed with a peripheral groove 25 and is adapted to engage clutch teeth 26 and 27, formed upon the respective gears 23 and 15. Such selective engagement affords a selection of either of the constant mesh gear sets 23, 24 or 15, 16 as will be readily apparent. The foregoing specific structure constitutes no part of the present invention and is taken from practice which is now quite common. To actuate clutch 12, a shifting lever 28 is provided, the lever being journaled upon a shaft 29 and provided with a yoke 30 by means of which axial motion may be imparted to clutch 12. In shifting clutch 12 into engagement with either of the teeth 26 or 27 it has been found that excessive clashing and shock results. In order to eliminate such objectionable conditions and in accordance with the present invention, the clutch 12 is provided with toothed portions 31 and 32 which have substantially the same number of teeth that the respective gears 23 and 15 have. These teeth form narrow faced gears which engage with cooperating gears 33 and 34, respectively.

Gears 33 and 34 are journaled for independent rotation upon the countershaft 22 and the hubs thereof are adapted to be moved axially into engagement with clutch members 35 and 36, respectively, which engage against the hubs of the respective gears 24 and 16. Upon engagement of either of the hubs of gears 33 and 34 with the respective clutch members 35 and 36, the said gears will be brought into synchronous rotation with the respective gears 24 and 16. In this fashion, clutch 12 will be rotated at substantially the same speed as a selected gear 23 and 15 into engagement with which the clutch is to be moved.

In order that the proper clutch 35 and 36 may be actuated upon the shifting of clutch 12 an arm 37 is secured to the lever 28 and connected to a sleeve 38 by means of a link 39. Sleeve 38 is journaled for rotation upon a hub 40 and is provided with a spring-pressed detent 41 which normally causes the hub and sleeve to move together. Upon the sleeve 38, a yoke 42 is provided for engaging the hub of either of the gears 33 or 34. Upon a predetermined pressure placed upon the clutch members 35 and 36 by the hubs of the respective gears 33 and 34 a spring 43 permits the detent 41 to disengage a notch within hub 40 and permit such further shifting of clutch 12 as is necessary to perfect the shifting operation.

In operation, the gear 15 is secured to drive shaft 11 by axial movement of clutch 12 to the right, as viewed in the drawing. Such motion is imparted to the clutch 12 by means of lever 28, when moved in a counterclockwise direction (as viewed in the drawing). During such motion, lever 37 and link 39 cause sleeve 38 and hub 40 to be moved in a clockwise direction, as viewed in the drawing. This motion causes the yoke 42 to cause the hub of gear 34 to be moved against the clutch members 36 and cause gear 34 to be rotated synchronously with gear 16. Gear 16 then drives gear 15 at substantially the same speed as the clutch 12 and the teeth of the clutch thus move quietly into engagement with the teeth 27.

It will thus be seen that a clutch synchronizing device has been provided which is conveniently incorporated within a transmission construction of common form and is adapted to be actuated simultaneously with the actuation of the transmission clutch member to effect the synchronization of the clutch member with the gear into engagement with which such member is moved. The elements of the synchronizing device are simple in construction and operation and can be incorporated in a transmission construction without adding appreciable length thereto.

While the invention has been described with specific reference to the accompanying drawing, it is not to be limited, save as defined in the appended claims.

We claim as our invention:

1. In combination with spaced sets of gears the gears of each set being in constant mesh, and a clutch movable into engagement with a gear of each of the sets, axially spaced gear teeth formed on the clutch, gears coaxial and rotatable with respect to gears of the sets and engaging the teeth on the clutch, clutches between each of the last named gears and the respective coaxial gears of the sets, and means to move one of the last named gears to rotate with its corresponding gear set.

2. In combination with a driving shaft, a countershaft parallel to the driving shaft, two sets of constant mesh gears, one gear of each set mounted coaxial with the driving shaft and one gear of each secured to the countershaft, and a clutch slidable between the gears of the sets coaxial with the driving shaft, axially spaced gear teeth on the clutch, gears rotatably mounted on the countershaft and engaging the teeth of the clutch, clutches between the last named gears and the adjacent gears of the first sets on the countershaft, and means actuated with the first clutch to actuate a selected one of the last named clutches.

3. In combination with a driving shaft, a countershaft parallel to the driving shaft, two sets of constant mesh gears, one gear of each set mounted coaxial with the driving shaft and one gear of each set secured to the countershaft, and a clutch slidable between the gears of the sets coaxial with the driving shaft, axially spaced gear teeth on the clutch, gears rotatably mounted on the countershaft and engaging the teeth of the clutch, clutches between the last named gears and the adjacent gears of the first sets on the countershaft, a yoke to move either of the last named gears into engagement with its respective clutch to drive the said last named gears by the respective constant mesh gear sets, actuating means for the first clutch, and means operated by the last named actuating means for moving the yoke to engage the one of the last named gears adjacent the gear set, into engagement with which the first clutch is moved, with the clutch and said gear set.

4. In combination with a driving shaft, a countershaft parallel to the driving shaft, two sets of constant mesh gears, one gear of each set mounted coaxial with the driving shaft and one gear of each set secured to the countershaft, and a clutch slidable between the gears of the sets coaxial with the driving shaft, axially spaced gear teeth on the clutch, gears rotatably mounted on the countershaft and engaging the teeth of the clutch, the ratios of the last named gears and corresponding gear teeth on the clutch being substantially that of the adjacent constant mesh gear set, clutches between the last named gears and the adjacent gears of the first sets on the countershaft, a yoke to move either of the last named gears into engagement with its respective clutch to drive the said last named gears by the respective constant mesh gear sets, actuating means for the first clutch, and means operated by the last named actuating means for moving the yoke to engage the one of the last named gears adjacent the gear set, into engagement with which the first clutch is moved, with the clutch and said gear set.

GOTTFRIED WIRRER.
AZOR D. ROBBINS.